United States Patent Office 3,471,186
Patented Oct. 7, 1969

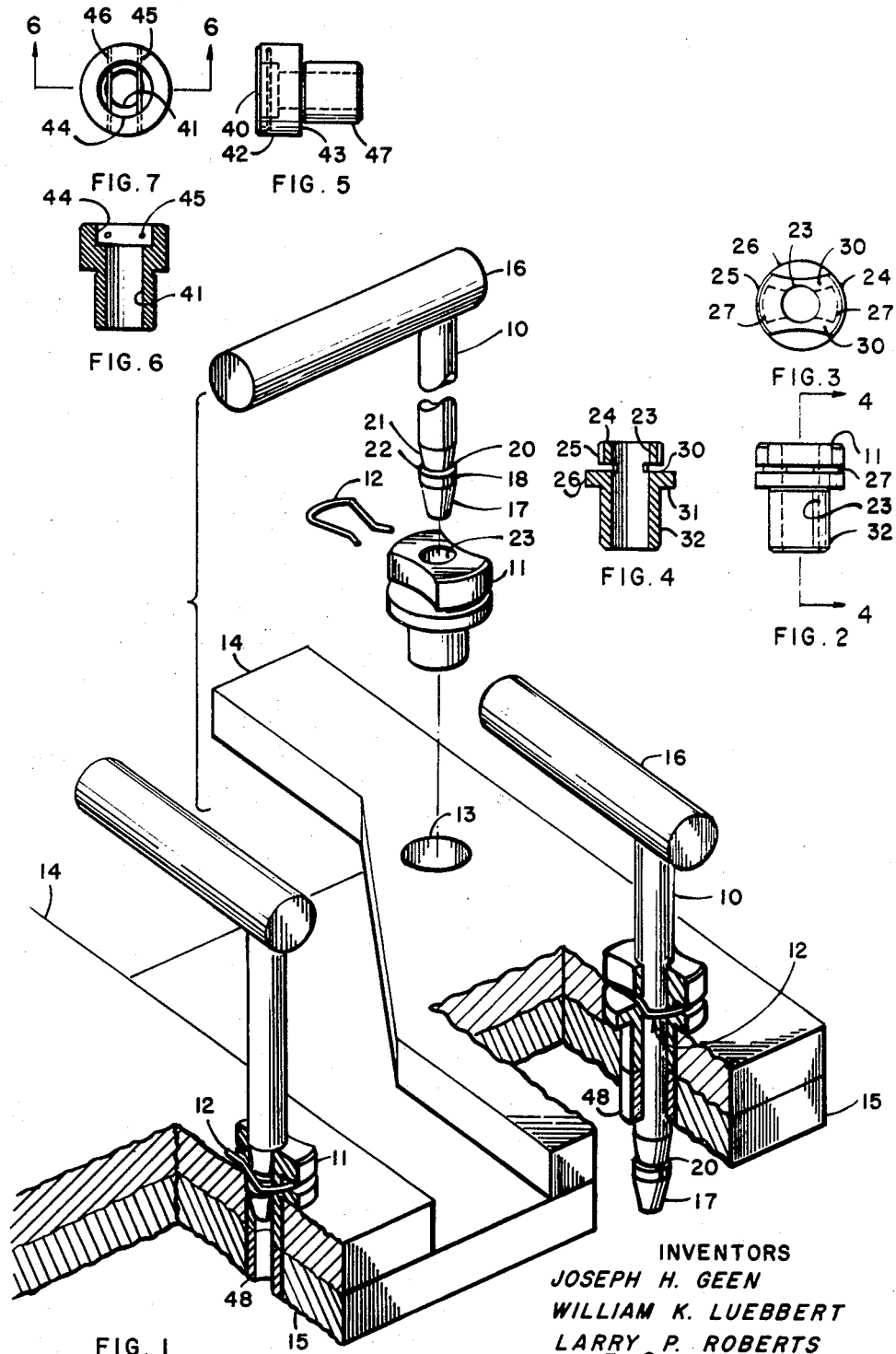

3,471,186
PIN AND BUSHING ASSEMBLY
William K. Luebbert, Florissant, Joseph H. Geen, Affton, and Larry P. Roberts, Hazelwood, Mo., assignors to American Drill Bushing Co., Los Angeles, Calif., a corporation of Maryland
Filed Oct. 16, 1967, Ser. No. 675,371
Int. Cl. F16b 7/00, 1/00, 9/00
U.S. Cl. 287—126        7 Claims

ABSTRACT OF THE DISCLOSURE

The assembly includes a tapered locating pin having a circumferential groove at the lower end, and a special bushing which interfits a support. The bushing includes a bored hole, slidably receiving the pin, and a head on which a retaining spring is mounted. The spring enters the bored hole and engages the groove of the pin to preclude withdrawal of the pin from the bushing. The pin in its operable position projects beyond the bushing, and provides a means of aligning the support with a second support member.

Background of the invention

This invention relates generally to a pin and bushing assembly, and particularly to a means of retaining a locating pin in a jig assembly when the assembly is not in use.

In jigs and fixtures, in which two or more parts are to be connected together to provide a temporary set-up, it is of great importance that the connection be simple and capable of rapid accomplishment. This is particularly true in mass production processes, and it has been found that the use of cylindrical pins as the fastener means facilitates the rapid interchange of jig parts.

By using locating pins, which project from one jig element, that element may be speedily aligned with another element which is provided with cooperating holes receiving the pins. Unfortunately, there is one particular drawback to the use of pins rather than other fasteners. The pins are susceptible to working free from the holes, especially when the removable jig element is not in use, and hence frequently becomes lost.

The present assembly precludes this possibility entirely by providing a means of retaining the pin in one of the jig elements. This is done in such a way that the jig and the locating pin cannot be separated unless such separation is specifically desired.

At the present time, the common method of attempting to insure that the pins remain in the proximity of the parts, which they are intended to connect, is to attach them to one of the parts by means of a chain or cable. The inherent drawbacks of this system are obvious. The cables do not actually prevent the pins from becoming disengaged from the cooperating holes and, as a result of dangling free, they interfere with storage when the parts are not in use, and are often broken during handling. In addition, the flexible members impede the freedom of movement of an operator when the parts are in use. No such disadvantages exist in the present pin and bushing assembly in which the pin remains engaged during storage, and which has no flexible member of any kind to interfere with the movements of an operator during use. Set screws also have been used to retain the pins, but they suffer from the obvious disadvantage of having to be tightened, and valuable time is lost.

Although pin connections are known in the prior art, which includes means to preclude withdrawal from a member into which they are inserted, no known connection either suggests or anticipates the present pin and bushing structure, and particularly not in connection with jigs and fixtures.

One type of connection known in the prior art includes a pin which interfits a support member, the support member being provided with an external, integral annular lip. The pin includes a knob at the remote end which engages the annular lip after withdrawal of the pin from the body of the support. This type of connection is generally intended to hold the pin in a hanging position, and is not therefore firmly supported in its disengaged position. There is no bushing provided in this type of connection or a spring means carried by the bushing which retains the pin.

Another type of connection includes a pin having a necked portion on which is mounted an annular spring washer. The washer is disposed between the connected parts, and thereby spaces said parts, precluding direct bearing contact. This disadvantage does not appear in the present pin and bushing assembly. Again, in this heretofore conventional connection there is no bushing having a built-in retention means.

Summary of the invention

The assembly includes a bushing, which is received in a support, and a pin which is slidably received within the bushing. The bushing includes a mounting means for a removable, pin-retaining spring, the spring engaging the pin to preclude withdrawal of the pin from the bushing. The pin is provided with a notch with which the retaining spring engages.

The bushing includes a head which provides a stop shoulder aligning the bushing in the support and limiting the insertion of the bushing in the support. The head of the bushing provides the means mounting the spring, the mounting having opposed surfaces engaging the sides of the spring in the direction of longitudinal movement of the pin. The bushing includes a longitudinal recess slidable receiving the pin, and the spring is disposed to enter the longitudinal recess and engage with the notch of the pin, preventing complete withdrawal of the pin from the bushing.

The pin notch is provided by a circumferential groove and the retaining spring is substantially U-shaped having a waist portion which enables the spring to be clipped into place around the pin groove. The remote end of the pin is tapered, and in its operable position projects from the support to locate the support relative to a second support, and to provide a connection between both supports.

Brief description of the drawing

FIG. 1 is a fragmentary, perspective view of the assembly illustrating two sectional views of the bushing, with the pin in both the retracted and operable position, and also an exploded view of the pin, bushing and spring.

FIGS. 2, 3 and 4 are an elevational view, a top plan view and a cross-sectional view respectively, of one embodiment of the bushing, and FIGS. 5, 6 and 7 are an elevational view, a cross-sectional view and a top plan view respectively, of another embodiment of the bushing.

Description of the preferred embodiments

Referring now by characters of reference to the drawing, and first to FIG. 1 which contains three views of the same pin and bushing assembly, it will be understood that the exploded view of the assembly includes a locating pin 10, a special bushing 11, and a pin-retaining spring clip 12, the spring clip 12 having a substantially U-shaped configuration. The special bushing 11 is first fitted into a hole 13 provided in the plate 14, the plate 14 constituting a support. In its operational position, the pin 10 locates the plate 14 with respect to a second plate 15, which also constitutes a support, and that the plate 15 includes a conventional bushing 48 into which the pin 10 is slidably received. The two plates 14 and 15 are thereby aligned and interconnected by one or more pins 10.

The locating pin 10, which is preferably circular in cross-section, includes a handle 16. The pin 10 is tapered at its remote end 17. Disposed from the remote end of the pin is a circumferential notch or groove 20 which includes a tapered face 21 tapered relative to the axis of the pin and a substantially transverse, annular notch shoulder 22.

The special bushing 11, which is shown in FIG. 1, is shown also in FIGS. 2, 3 and 4. It will be observed that the special bushing 11 includes a bored hole 23 which constitutes a longitudinal recess, and which slidably receives the pin 10. The bushing 11 includes an enlarged head 24 which has an upper portion 25 and a lower portion 26 separated by a pair of opposed integral spacer portions 27. The upper and lower head potions 25 and 26 of the head 24 ovelap the spacers 27 to provide a lateral groove 30 communicating with opposite sides of the bored hole 23. The groove 30 receives the substantially U-shaped pin-retaining spring clip 12. Thus, when the retaining spring 12 is received by the groove 30, each spring leg enters the longitudinal recess provided by the bore 23 and extends into the path of the pins. The spring 12 engages opposite sides of the notch shoulder 22 provided by the circumferential groove 20 of the pin 10 when the pin 10 is withdrawn. The engagement between the spring 12 and the notch provided by the circumferential groove 20 precludes withdrawal of the pin 10 from the special bushing 11. The sectional view of the bushing 11 at the lower portion of FIG. 1 clearly illustrates the engagement of the spring 12 with the groove 20 which takes place when the pin 10 is in its retracted position.

It will be understood that the spacer portions 27 of the head 24 as shown in FIG. 3 are inwardly disposed with respect to opposing margins of the upper and lower portions 25 and 26 of the head, adjacent the groove 30. This disposition insures that the spring 12 in its operable position is concealed. The legs of the spring 12 have a substantially inwardly curved configuration which cooperates with the compatible spacer portions 27 to retain the spring 12 in its mounted position straddling the spacer portions 27 until pried from that position by the use of a screwdriver or other suitable tool to spread the spring legs and to remove the spring.

The underside of the lower portion 26 of the head 24 constitutes a stop shoulder 31 that engages the plate 14 to limit the insertion of the body portion 32 of the bushing 11 in the hole 13.

FIGS. 5, 6 and 7 illustrate an alternative embodiment of a special bushing 40. The bushing 40 includes a bored hole 41 constituting a longitudinal recess which slidably receives the pin 10. The upper portion of the bushing 40 includes a head 43 which is provided with a socket 44 concentric with and part of the bore 41.

A pair of elongate springs 45 is provided, each spring 45 being retained in compatible, laterally bored holes 46 constituting grooves. The holes 46 are at least partially defined by opposed surfaces engaging opposite sides of the springs 45 in the direction of longitudinal movement of the pin 10. The mid-portions of the elongate springs 45 enter the longitudinal recess provided by the socket 44 to engage the groove 20 of the pin 10, whereby to preclude withdrawal of the pin 10 from the special bushing 40.

It will be understood that, in both embodiments of the special bushing as represented by numerals 11 and 40, there is an overlap between the retaining spring and the annular notch shoulder 22 provided by the pin 10, and that the spring extends into the path of the pin 10 and engages this shoulder 22, thereby preventing the withdrawal of the pin 10 from these special bushings 11 and 40.

In the embodiment of FIGS. 5–7, the underside of the head 42 provides an annular stop shoulder 43 which engages the plate 14 and limits the insertion of the body portion 47 in the hole 13. It will be observed that in both embodiments, the special bushing 11 or 40 is provided with such a head 24 or 42 respectively.

A special bushing not shown may be provided which has a constant external diameter. This constant diameter of bushing may be achieved simply by providing a body portion 32 or 47 of the same diameter as the present diameter of the heads 42 and 24 respectively. If this were done, then of course, the hole 13 in plate 14 would be bored to a suitable diameter to accept the constant diameter special bushing. If desired, the hole 13 could be of a depth such as to provide that the constant diameter special bushing be flush with the upper face of the plate 14. The springs would be substantially hidden from view, and inaccessible, unless such bushing were removed from the plate 14.

It is thought that the functional advantages of this pin and bushing assembly have become fully apparent from the foregoing description of parts, but for completeness of disclosure, the installation of the assembly will be briefly described. It is believed that reference need be made only to the installation of the pin 10 in the special bushing 11, the like installation of special bushing 40 being obvious in light of this disclosure.

The body portion 32 of the special bushing 11 is inserted into the hole 13 of the support plate 14, the body 32 being a press fit into the hole 13. The stop shoulder 31 engages the plate 14 and insures that the special bushing 11 does not project beyond the underside of the plate 14. The retaining spring 12 is mounted on the bushing 11 by pushing it into the groove 30 opposed surfaces of the upper and lower portions 25 and 26 of the head 24 engaging opposite sides of the spring 12 in the direction of longitudinal axial pin movement.

The pin 10 is inserted into the longitudinal recess provided by the bored hole 23, the tapered remote end 17 of the pin 10 facilitating the insertion and providing wedge action to spread the spring legs outwardly.

Further insertion of the pin 10 causes the spring clip 12 to snap back toward its original position, and thereby preclude withdrawal of the pin 10 from bushing 11 because of the engagement between the pin-retaining spring 12 and the notch shoulder 22. Further downward insertion of the pin 10 is, however, possible because of the wedge action on the spring legs by the tapered face 21 of the circumferential groove 20. The pin 10 may therefore be inserted until it projects beyond the underside of the plate 14 and beyond the special bushing 11.

It will be clear that a plate 14, having one or more pins 10 projecting from it, may be aligned with a second support plate 15 which includes conventional bushings 48 into which the locating pins 10 may be received. It will be understood that the tapered end 17 of the pin 10 facilitates the aligning process.

When the jig assembly is to be dismantled, the pin 10 is withdrawn by simply pulling upwardly on the handle 16. The spring 12 will prevent total withdrawal of the pin 10 by engagement with the annular notch shoulder 22 provided by the groove 20. A portion of the pin 10 having a constant diameter, such as that portion 18 which extends between the groove 20 and the tapered portion 17, is received in the compatible longitudinal recess of the bushing 11 to hold the pin 10 securely in place even in its withdrawn position. The pin 10 preferably does not project beyond the underside of the support plate 14 and the special bushing 11 when the pin 10 is in its withdrawn position. The storage of the upper support plate 14 and its associated and retained pin 10 is thereby facilitated.

Although the invention has been described by making detailed reference to preferred embodiments such detail is to be understood in an instructive rather than in restrictive sense. Variations are of course possible: for example, the holes 46 in the alternative embodiment may be laterally interconnected to form a single slot rather than a pair of holes and thus permit the use of a single, substantially U-shaped spring rather than the undivided elongate springs 45. Other variations will occur to one skilled in the art.

We claim as our invention:

1. A pin and bushing assembly, comprising:
   (a) a bushing open at each end and adapted to be received in a support,
   (b) a pin slidably received in and projecting beyond the bushing, the pin including a notch having a tapered portion tapered toward said projecting end, and a shoulder portion disposed between said tapered portion and said projecting end,
   (c) a retaining spring, and
   (d) mounting means mounting the spring on the bushing the spring engaging the shoulder to retain the pin in the bushing in its withdrawn position yet permit selective penetration of the pin in the bushing.

2. An assembly as defined in claim 1, in which:
   (e) the bushing includes a longitudinal recess slidably receiving the pin, and
   (f) The spring enters the recess and is supported by the bushing at opposed points across the recess and engages the notch shoulder, in the recess, whereby to preclude withdrawal of the pin from the bushing.

3. An assembly as defined in claim 1, in which:
   (e) the bushing includes a head portion providing a shoulder adapted to engage the support and preclude relative axial movement of the bushing in one direction, and
   (f) the bushing includes a longitudinal recess slidably receiving the pin,
   (g) the head portion of the bushing includes a lateral groove communicating with the recess and providing the mounting means, the groove being defined by opposed surfaces engaging opposite sides of the spring in the direction of longitudinal axial movement of the pin, and
   (h) the spring is removably mounted in the lateral groove and enters the longitudinal recess to engage the notch shoulder, whereby to preclude withdrawal of the pin from the bushing.

4. An assembly as defined in claim 1, in which:
   (e) the support that receives the bushing is provided, and is an independent plate,
   (f) the bushing includes a longitudinal recess slidably receiving the pin, and
   (g) the spring is removably and slidably extended into the longitudinal recess to engage the notch shoulder, whereby to preclude withdrawal of the pin from the bushing.

5. An assembly as defined in claim 1, in which:
   (e) the support, that receives the bushing is provided,
   (f) the pin includes a substantially circular groove providing the notch,
   (g) the bushing includes a head portion providing a shoulder engaging the support and precluding relative axial movement of the bushing in one direction, and
   (h) the bushing includes a longitudinal recess slidably receiving the pin,
   (i) the head portion includes a lateral groove providing the mounting means, the lateral groove being defined by opposed surfaces engaging opposite sides of the spring in the direction of longitudinal axial movement of the pin, and
   (j) the spring is removable and is substantially U-shaped providing a pair of spring legs entering opposite sides of the longitudinal recess to engage the pin groove, whereby to preclude withdrawal of the pin from the bushing.

6. An assembly as defined in claim 1, in which:
   (e) the support, that receives the bushing, is provided,
   (f) a second support receives the pin projecting beyond the bushing, the second support including a bushing and the pin aligning the bushings of the first and second supports in concentric relation.

7. An assembly as defined in claim 1, in which:
   (e) the support, that receives the bushing, is provided,
   (f) a second support including a hole,
   (g) the bushing includes a longitudinal recess slidably the pin,
   (h) the hole in the second support receives the pin projecting beyond the bushing, the pin aligning the hole and the recess in concentric relation, and
   (i) the spring enters the longitudinal recess to engage the notch shoulder, whereby to preclude withdrawal of the pin from the bushing.

References Cited

UNITED STATES PATENTS

| 2,021,241 | 11/1935 | Mall | 285—305 X |
| 3,006,443 | 10/1961 | Siler. | |
| 3,065,003 | 11/1962 | Whitehouse | 287—119 |

CARL W. TOMLIN, Primary Examiner

W. L. SHEDD, Assistant Examiner

U.S. Cl. X.R.

269—47; 285—305; 287—20